United States Patent
Yang et al.

(10) Patent No.: US 10,562,718 B1
(45) Date of Patent: Feb. 18, 2020

(54) VARIABLE SPACING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Wei-Da Yang, New Taipei (TW); Li-Quan Zhang, Shenzhen (CN); Qing Cai, Shenzhen (CN); Jun-Gang Li, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/371,348

(22) Filed: Apr. 1, 2019

(30) Foreign Application Priority Data

Feb. 19, 2019 (CN) .................... 2019 2 0226979 U (51) Int. Cl.
*B65G 47/91* (2006.01)
*B25J 15/00* (2006.01)
*B65G 47/90* (2006.01)

(52) U.S. Cl.
CPC ......... *B65G 47/907* (2013.01); *B65G 47/918* (2013.01); *B65G 2201/02* (2013.01)

(58) Field of Classification Search
CPC ........................... B65G 47/907; B65G 47/918
USPC ................. 294/87.1, 87.12, 87.23
See application file for complete search history.

(56) References Cited

U.S. PATENT DOCUMENTS

| | | | | |
|---|---|---|---|---|
| 6,439,631 B1* | 8/2002 | Kress | ................... | B65G 47/918 294/65 |
| 7,690,706 B2* | 4/2010 | Wild | .................... | B65G 47/907 294/65 |
| 7,850,217 B2* | 12/2010 | Lo | ...................... | G01R 31/2893 294/65 |
| 8,038,191 B2* | 10/2011 | Shim | .................. | H05K 13/0482 294/65 |
| 9,120,625 B2* | 9/2015 | Begin | .................. | B65G 47/082 |
| 9,446,526 B2* | 9/2016 | Sun | ....................... | B25J 15/0616 |
| 10,184,608 B2* | 1/2019 | Huang | .................. | B65G 47/28 |
| 10,351,357 B1* | 7/2019 | Grovijohn | ............ | B25J 15/0019 |
| 2008/0284186 A1* | 11/2008 | Shim | ................. | H01L 21/68707 294/87.1 |
| 2012/0104782 A1* | 5/2012 | Weaver | ................... | B65B 21/06 294/87.1 |

(Continued)

*Primary Examiner* — Paul T Chin
(74) *Attorney, Agent, or Firm* — ScienBiziP, P.C.

(57) ABSTRACT

A variable spacing device includes a support member, a driving member, a number of movable graspers, a limiting block, and a pushing block. The movable graspers are slidably mounted in a line on the support member. Each movable grasper grasps a workpiece. The limiting block is mounted on the support member and arranged in parallel with the pushing member. The limiting block defines first sliding grooves having a length gradually decreasing along a same direction. The pushing block defines second sliding grooves having a length gradually increasing along a same direction. Each movable grasper moves within a corresponding one of the first sliding grooves and a corresponding one of the second sliding grooves. Two sidewalls of each first sliding groove and two sidewalls of each second sliding groove resist movement of the corresponding movable grasper.

20 Claims, 4 Drawing Sheets

(56) References Cited

U.S. PATENT DOCUMENTS

2012/0112483 A1* 5/2012 Chen .................... B25B 11/007
                                                    294/87.1
2012/0200100 A1* 8/2012 Maffeis ................ B25J 15/0052
                                                    294/87.1

* cited by examiner

VARIABLE SPACING DEVICE

FIELD

The subject matter herein generally relates to a variable spacing device.

BACKGROUND

In industrial production, there are occasions where the spacing of multiple workpieces needs to be changed. For example, multiple workpieces are spaced apart on a processing platform at intervals to facilitate processing. However, when the spacing of a plurality of workpieces needs to be adjusted, since the spacing of the workpieces may be required to not be uniform, a single driving member cannot be used to adjust the spacing.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 1:
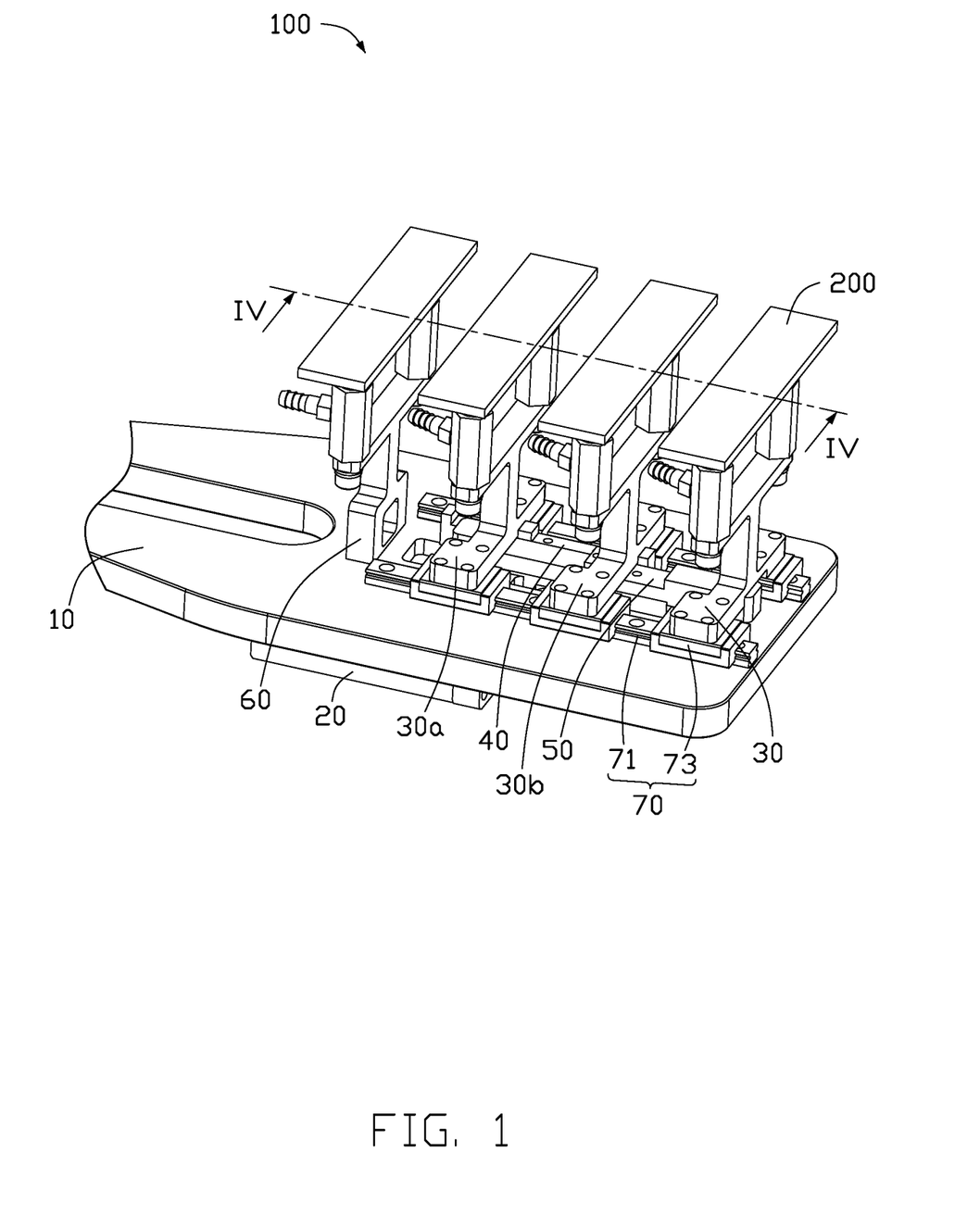
FIG. 1 is an assembled, isometric view of an embodiment of a variable spacing device with a plurality of workpieces.

FIG. 1 shows a variable spacing device 100 for adjusting a spacing of a plurality of workpieces 200. In one embodiment, the variable spacing device 100 includes a support member 10, a driving member 20, a plurality of movable graspers 30, 30a, 30b, a limiting block 40, a pushing block 50, and a fixed grasper 60. In one embodiment, the number of the graspers 30, 30a, 30b is three, but is not limited thereto. The movable graspers 30, 30a, 30b and the fixed grasper 60 are linearly arranged on the support member 10, and the movable graspers 30, 30a, 30b are slidably mounted on the support member 10. Specifically, the variable spacing device 100 further includes at least one guiding member 70. In one embodiment, the number of the guiding members 70 is two, but is not limited thereto. The guiding member 70 includes a guiding rail 71 and a plurality of sliding blocks 73. The two guiding rails 71 are spaced apart on the support member 10. The plurality of sliding blocks 73 are slidably mounted on the two guiding rails 71, respectively. Each of the movable graspers 30, 30a, 30b is coupled to a corresponding one of the sliding blocks 73 on the guiding rails 71. The graspers 30, 30a, 30b and the fixed grasper 60 are used to grasp a workpiece 200.

Figure 3:
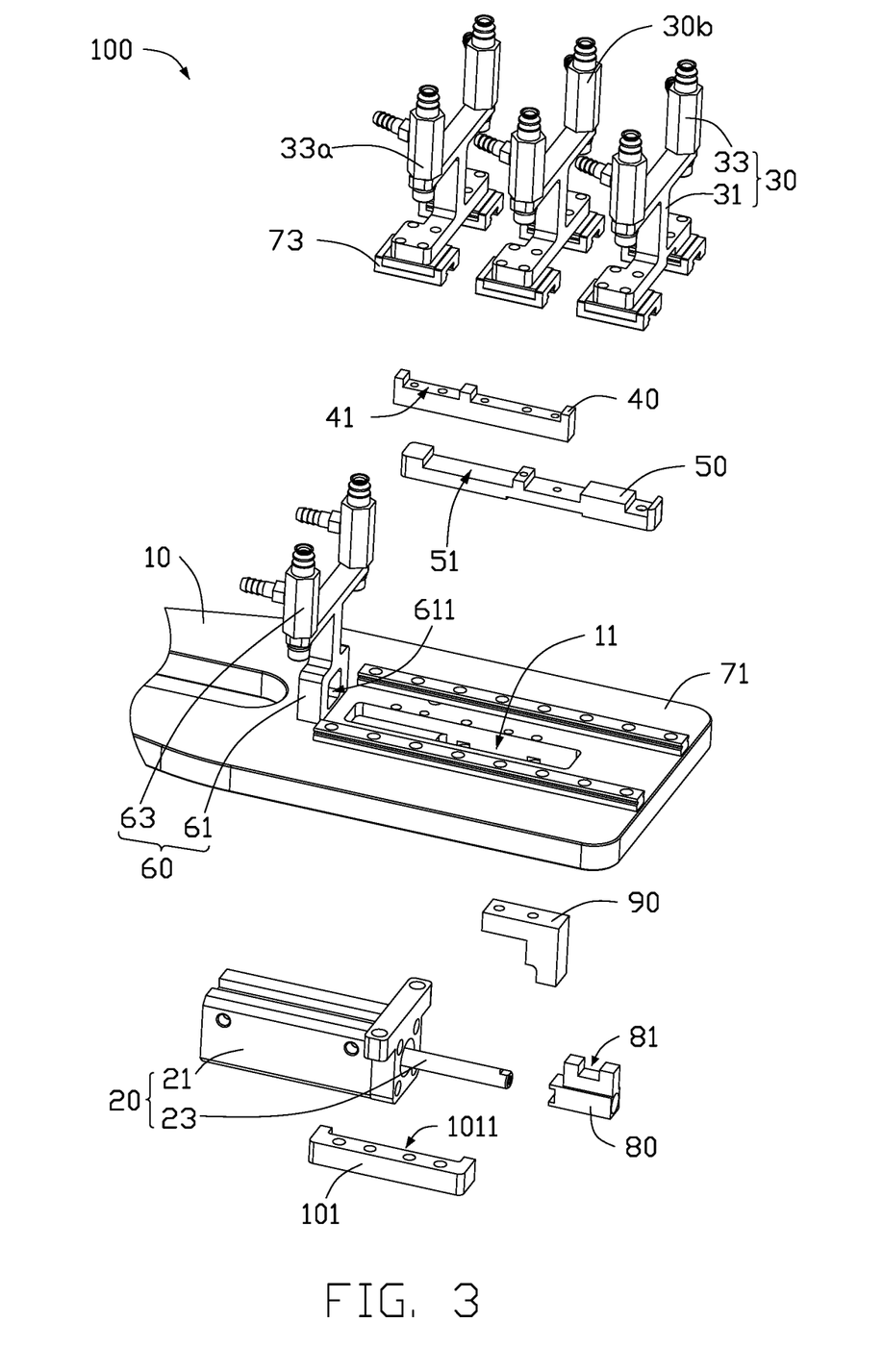
FIG. 3 is an exploded view of the variable spacing device of FIG. 1.

Referring to FIG. 1 and FIG. 3, the limiting block 40 is mounted on the support member 10. The pushing block 50 is arranged in parallel with the limiting block 40. The limiting block 40 defines a plurality of first sliding grooves 41, 41a along a sliding direction of the movable graspers 30, 30a, 30b, and the pushing block 50 correspondingly defines a plurality of second sliding grooves 51, 51a. The pushing block 50 is coupled to an outermost one of the movable graspers 30. In one embodiment, the pushing block 50 is coupled to the movable grasper 30 of the plurality of movable graspers 30, 30a, 30b that is arranged farthest from the fixed grasper 60. Each of the remaining movable graspers 30a, 30b is movable within the respective first groove 41, 41a and the respective second groove 51, 51a. Two sides of each of the movable graspers 30a, 30b are respectively blocked by two sidewalls of the first sliding slots 41, 41a and two sidewalls of the second sliding slots 51, 51a. The driving member 20 is mounted on the support member 10 and coupled to the pushing block 50. The driving member 20 can drive the pushing block 50 to move the movable grasper 30 to move back and forth, such that the sidewalls of the plurality of second sliding grooves 51, 51a are sequentially attached to the corresponding movable graspers 30a, 30b to move the movable graspers 30a, 30b until the sidewalls of the movable graspers 30a, 30b are stopped when they are resisted against by the sidewalls of the first grooves 41, 41a, respectively.

A length of one of the plurality of first sliding grooves 41, 41a of the stopping block 40 is shorter than the length of the other one of the first sliding grooves 41, 41a along a direction toward the fixed grasper 60a. Correspondingly, a length of one of the plurality of second sliding grooves 51, 51a of the pushing block 50 is longer than the length of the other one of the second sliding grooves 51, 51a along the direction toward the fixed grasper 60a. In one embodiment, the movable grasper 30 coupled to the pushing block 50 has a longest moving distance, and a moving distance of the movable graspers 30a, 30b is sequentially decreased. The driving member 20 is driven to move the pushing block 50 to sequentially move the plurality of movable graspers 30, 30a, 30b. The stopping block 40 simultaneously stops the grasper 30, 30a, 30b to stop the graspers 30, 30a, 30b at the same time. When the driving member 20 drives the pushing block 50 to move the movable graspers 30, 30a, 30b toward the fixed grasper 60, a length of the plurality of workpieces 200 becomes smaller. Likewise, when the driving member 20 drives the pushing block 50 to move the moving graspers 30, 30a, 30b away from the fixed grasper 60, the length of the plurality of workpieces 200 becomes larger. Thus, grasping the plurality of workpieces 200 by the graspers 30, 30a, 30b and the fixed grasper 60 is achieved by one driving member 20.

The number of the first grooves 41, 41a and the second grooves 51, 51a are equal and are adjusted according to the number of workpieces 200 needed to be adjusted. In one embodiment, the first grooves 41, 41a and the second grooves 51, 51a are two, but are not limited thereto. The first groove 41 and the first groove 41a are sequentially defined in the direction from the fixed grasper 60 toward the movable grasper 30 with increasing length, and the second groove 51 and the second groove 51a are sequentially defined in the direction from the fixed grasper 60 toward the movable grasper 30 with decreasing length.

In one embodiment, the number of workpieces 200 is the sum of the number of fixed graspers 60 and graspers 30, 30a, 30b, but is not limited thereto. It can be understood that in other embodiments, each of the movable graspers 30 or the fixed grasper 60 can also grab a plurality of workpieces 200. The number of workpieces 200 is not limited as long as the driving member 20 can drive the plurality of movable graspers 30, 30a, 30b to move.

Figure 4:
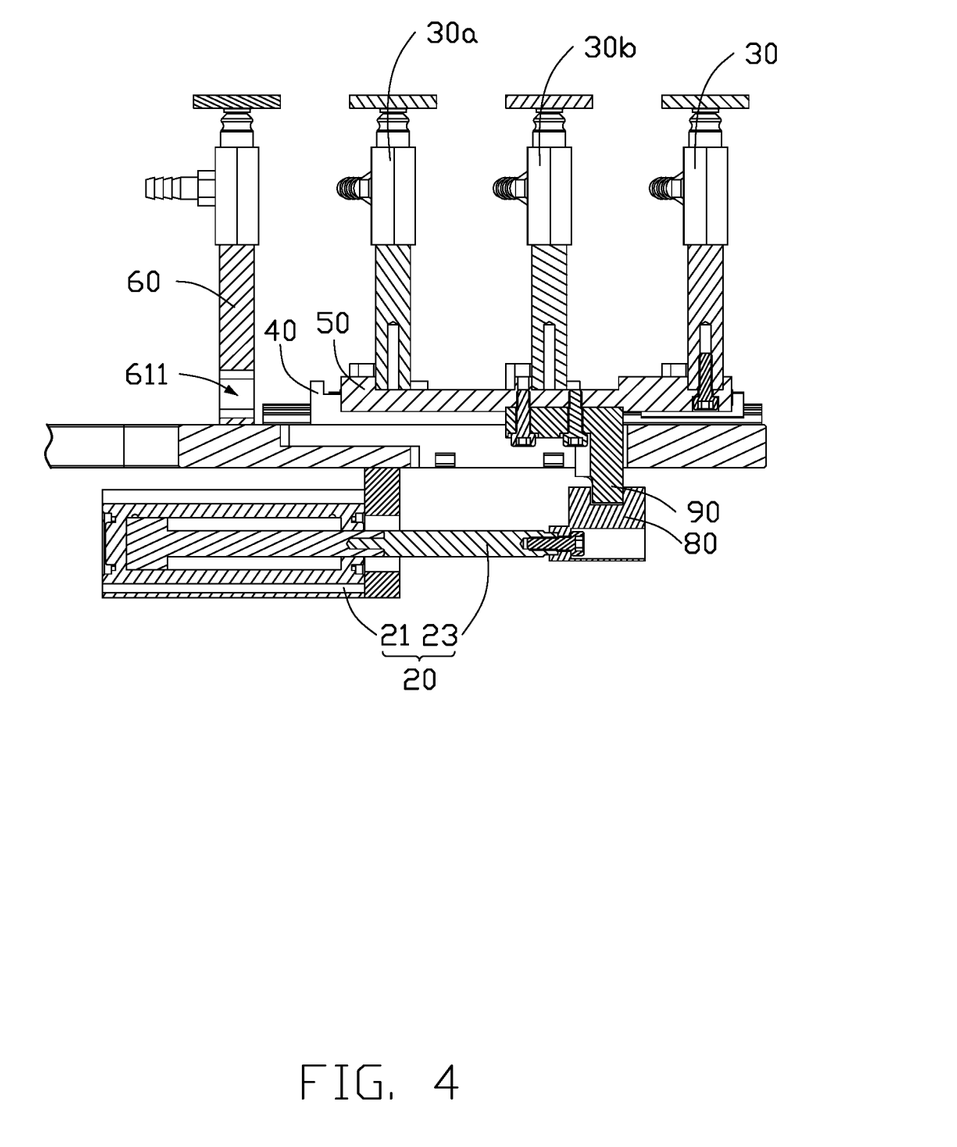
FIG. 4 is a cross-sectional view along the dash line IV-IV of the variable spacing device of FIG. 1.

Referring to FIG. 3 and FIG. 4, along the direction of the plurality of movable graspers 30 toward the fixed grasper 60, the amount of movement of a specific movable grasper of the movable graspers 30, 30a, 30b moving back and forth is equal to a sum of a change in distance of the workpieces 200 moved by the remaining movable graspers of the movable graspers 30, 30a, 30b between the specific movable grasper and the fixed grasper 60. For example, in an embodiment, when the movable graspers 30a, 30b move away from the fixed grasper 60, the distance between the workpiece 200 grasped by the movable grasper 30a and the workpiece 200 grasped by the fixed grasper 60 is changed by 12 mm, and the distance between the workpiece 200 grasped by the movable grasper 30b and the workpiece 200 grasped by the movable grasper 30a is changed by 14 mm. Then, when the movable graspers 30a, 30b move toward the fixed grasper 60, the amount of movement of the grasper 30a moving back toward the fixed grasper 60 is 12 mm, and the amount of movement of the grasper 30b moving back toward the fixed grasper 60 is 26 mm. It can be understood that in other embodiments, the amount of change in the spacing of the plurality of workpieces 200 may be the same or other amount of change.

Referring to FIG. 3, the lengths of the first sliding grooves 41, 41a, that is, the distance between the two sidewalls, is equal to the sum of the moving distance of the movable graspers 30a, 30b within the first sliding grooves 41, 41a and the thickness of the two sidewalls of the first sliding grooves 41, 41a and the second sliding grooves 51, 51a respectively adhered to the movable graspers 30a, 30b. For example, in one embodiment, the distance between the two sidewalls of the first groove 41a where the movable grasper 30b is located is equal to the sum of the moving distance 26 mm of the movable grasper 30b and the thickness of the two sidewalls of the first sliding groove 41a and the second sliding groove 51a adhered to the second movable grasper 30b.

A sum of a length difference of the first sliding grooves 41, 41a where the movable graspers 30a, 30b are respectively located and the length difference of the second sliding grooves 51, 51a where the movable graspers 30a, 30b are respectively located is zero. When each of the movable graspers 30a, 30b are moved back, the first grooves 41, 41a and the second grooves 51, 51a are capable of grasping and positioning the movable graspers 30a, 30b.

In an embodiment, the first sliding slot 41 includes a second sidewall 411 and a fourth sidewall 413, and the second sliding slot 51 includes a first sidewall 511 and a third sidewall 513. When the driving member 20 drives the pushing block 50 to move away from the fixed grasper 60, the first sidewall 511 of the second sliding groove 51 facing the fixed grasper 60 moves until the first sidewall 511 and the second sidewall 411 clamp the movable grasper 30a. The third sidewall 513 of the second sliding groove 51a facing the fixed grasper 60 moves until the third sidewall 513 and the fourth sidewall 413 of the first sliding groove 41a clamp the movable grasper 30b. The moving distance of the first sidewall 511 is equal to the sum of the lengths of the first sliding groove 41 and the second sliding groove 41. The moving distance of the third sidewall 513 is equal to the sum of the lengths of the first sliding groove 41a and the second sliding groove 51a. The distance of the first sidewall 511 and the third sidewall 513 is constant. Thus, the moving distance of the first sidewall 511 and the third sidewall 513 are the same. That is, the sum of the lengths of the first sliding groove 41 and the second sliding groove 51 is equal to the sum of the lengths of the first sliding groove 41a and the second sliding groove 51a. Thus, the sum of the length difference of the first sliding groove 41 and the first sliding groove 41a where the movable graspers 30a, 30b are respectively located and the length difference of the second sliding groove 51 and the second sliding groove 51a is zero.

In other embodiments, the fixed grasper 60 or the movable grasper 30 may be omitted.

In other embodiments, both the movable grasper 30 and the fixed grasper 60 may be omitted, and the number of the first grooves 41, 41a, the second grooves 51, 51a, and the movable graspers 30a, 30b may be set to a plurality of positions to adjust the spacing of the workpieces 200 grasped by the movable graspers 30a, 30b.

Referring to FIG. 3 and FIG. 4, in one embodiment, the support member 10 defines a through hole 11. The driving member 20 is located on a side of the support member 10 facing away from the limiting block 40, the pushing block 50, the fixed grasper 60, and the plurality of movable graspers 30, 30a, 30b. The pushing block 50 is slidable in the through hole 11 and coupled to the driving member 20 through the through hole 11. It can be understood that in other embodiments, the driving member 20, the limiting block 40, the pushing block 50, the fixed grasper 60, and the plurality of movable graspers 30, 30a, 30b can also be mounted on the same side of the support member 10, as long as the movable graspers 30, 30a, 30b are not blocked from sliding relative to the support member 10.

In an embodiment, the driving member 20 includes a movable driving member 21 and an output end 23. The movable driving member 21 is mounted on the support member 10. The output end 23 is mounted on the movable driving member 21. The movable driving member 21 is capable of driving the output end 23 to extend or retract.

In an embodiment, the variable spacing device 100 further includes a clamping block 80 and a connecting block 90. The clamping block 80 is mounted on the output end 23. The connecting block 90 is mounted on the pushing block 50. The clamping block 80 defines a latching slot 81 facing the connecting block 90. The connecting block 90 can be latched into the latching slot 81 to form a floating connection structure. It can be understood that in other embodiments, the clamping block 80 and the connecting block 90 may be omitted, such that the pushing block 50 is directly mounted on the output end 23.

Figure 2:
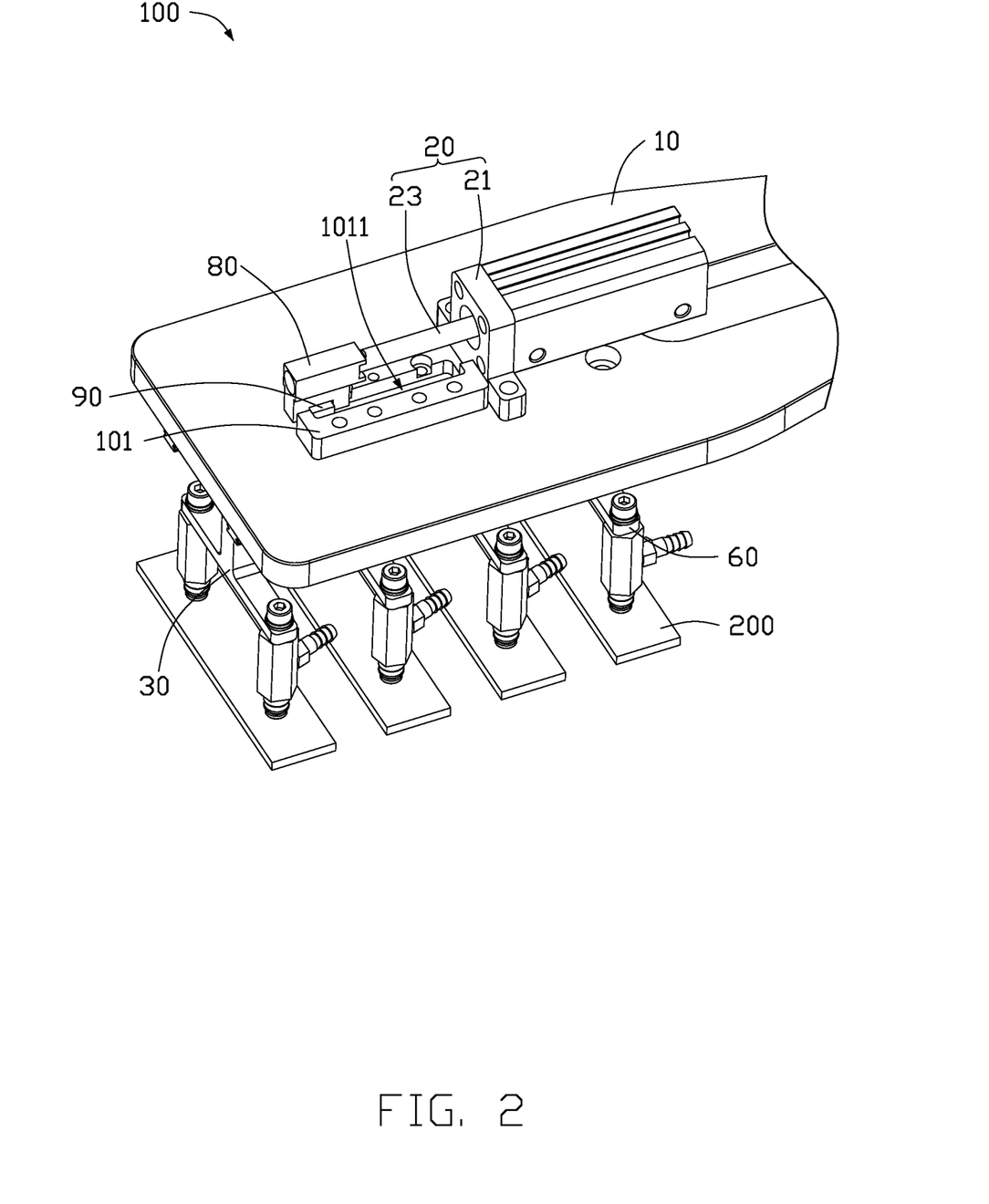
FIG. 2 is similar to FIG. 1, but showing the variable spacing device from another angle.

Referring to FIG. 2 and FIG. 3, in one embodiment, the variable spacing device 100 further includes a stopping block 101. The stopping block 101 is mounted on the support member 10. The stopping block 101 defines a stopping block groove 1011 facing the connecting block 90. The connecting block 90 is blocked by the sidewalls within the stopping block groove 1011 to limit the moving distance of the driving member 20 driving the pushing block 50. It can be understood that in other embodiments, the stopping block 101 may be omitted, such that the moving distance of the pushing block 50 is limited by the moving distance of the driving member 20.

Referring to FIG. 3, in an embodiment, the movable grasper 30 includes a movable bracket 31 and a grasping member 33. The movable bracket 31 is mounted on corresponding two sliding blocks 73. The grasping member 33 is mounted on the movable bracket 31. The fixed grasper 60 includes a fixed bracket 61 and a grasping member 63. The fixed bracket 61 is mounted on the support member 10. The grasping member 63 is mounted on the fixed bracket 61. The grasping member 33 and the grasping member 63 are used to grasp the workpiece 200. In one embodiment, the grasping member 33 and the grasping member 63 are a plurality of suction cups to adsorb the workpiece 200, but are not limited thereto. In other embodiments, the grasping member 33 and the grasping member 63 may be pneumatic graspers to grasp the workpiece 200.

In an embodiment, the fixed bracket 61 defines a clearance hole 611 facing the pushing block 50, and the pushing block 50 is configured to pass through the clearance hole 611.

In operation, when the driving member 20 drives the pushing block 50 and the movable grasper 30 to move toward the fixed grasper 60, the sidewall of the second sliding slot 51*a* where the movable grasper 30*b* is located first pushes the movable grasper 30*b* toward the fixed grasper 60. Then, the sidewall of the second sliding slot 51 where the movable grasper 30*a* is located pushes the movable grasper 30*a* toward the fixed grasper 60, thereby causing the movable graspers 30, 30*a*, 30*b* to cooperatively move toward the fixed grasper 60 until the movable graspers 30*a*, 30*b* are stopped by the sidewalls of the first sliding slots 41, 41*a*. Thus, the driving member 20 is capable of driving the movable graspers 30, 30*a*, 30*b* to move toward the fixed grasper 60 to reduce the spacing of the plurality of workpieces 200.

When the driving member 20 drives the pushing block 50 and the movable grasper 30 to move away from the fixed grasper 60, the sidewall of the second sliding slot 51*a* where the movable grasper 30*b* is located first pushes the movable grasper 30*b* to move away from the fixed grasper 60. Then, the sidewall of the second sliding slot 51 where the movable grasper 30*a* is located pushes the movable grasper 30*a* to move away from the fixed grasper 60. Thus, the movable graspers 30, 30*a*, 30*b* cooperatively move away from the fixed grasper 60 until the movable graspers 30*a*, 30*b* are stopped by the sidewalls of the first sliding slots 41, 41*a*. Thus, the driving member 20 is capable of driving the movable graspers 30, 30*a*, 30*b* to move away from the fixed grasper 60 to increase the spacing of the plurality of workpieces 200.

The variable spacing device 100 uses the second sliding grooves 51, 51*a* of the pushing block 50 arranged in parallel with the first sliding grooves 41, 41*a* of the limiting block 40, and the movable graspers 30*a*, 30*b* are located adjacent to each other. In the sliding grooves 41, 41*a* and the second sliding grooves 51, 51*a*, when the driving member 20 drives the pushing block 50 to move, the sidewalls of the first sliding grooves 41, 41*a* and the second sliding grooves 51, 51*a* are respectively moved. Two sides of the graspers 30*a*, 30*b* are clamped so that one driving member 20 drives the plurality of movable graspers 30, 30*a*, 30*b* to move to achieve a change in spacing of the plurality of workpieces 200. Thus, a structure of the variable spacing device 100 is simple and is low in cost.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A variable spacing device configured to adjust a spacing of a plurality of workpieces, the variable spacing device comprising:
 a support member;
 a driving member;
 a plurality of movable graspers;
 a limiting block; and
 a pushing block; wherein:
 the plurality of movable graspers are slidably mounted in a line on the support member;
 each of the plurality of movable graspers is adapted to grasp a workpiece;
 the limiting block is mounted on the support member and arranged in parallel with the pushing member;
 the limiting block defines a plurality of first sliding grooves each comprising a length, the length of each of the plurality of first sliding grooves being shorter than the length of a next adjacent sliding groove along a same direction;
 the pushing block defines a plurality of second sliding grooves each comprising a length, the length of each of the plurality of second sliding grooves being longer than the length of a next adjacent sliding groove along the same direction;
 each of the plurality of movable graspers is adapted to move within a corresponding one of the first sliding grooves and a corresponding one of the second sliding grooves;
 two sidewalls of each first sliding groove and two sidewalls of each second sliding groove resist movement of the corresponding movable grasper;
 a sum of a length difference of any two first sliding grooves and a length difference of any two second sliding grooves corresponding in position to two adjacent movable graspers is zero;
 the driving member is mounted on the support member and is coupled to the pushing block;
 the driving member is configured to drive the pushing block to move back and forth.

2. The variable spacing device of claim 1 further comprising a fixed grasper configured to grasp a workpiece; wherein:
 the fixed grasper is mounted on the support member on a side of the plurality of movable graspers; and
 one of the plurality of movable graspers is mounted on the pushing member.

3. The variable spacing device of claim 2, wherein:
 the fixed grasper comprises a fixed frame and a grasper;
 the fixed frame is mounted on the support member; and
 the grasper is mounted on the fixed frame.

4. The variable spacing device of claim 3, wherein:
the fixed frame defines a clearance hole facing the pushing block; and
the pushing block is adapted to pass through the clearance hole.

5. The variable spacing device of claim 1, wherein:
the support member defines a through hole;
the driving member is arranged on a side of the support member facing away from the pushing block, the limiting block, and the plurality of movable graspers;
the pushing block is configured to slide within the through hole and pass through the through hole to couple to the driving member.

6. The variable spacing device of claim 1, wherein:
the driving member comprises a movable driving member and an output end;
the movable driving member is mounted on the support member;
the output end is mounted on the movable driving member;
the movable driving member is configured to drive the output end to extend or retract.

7. The variable spacing device of claim 6 further comprising a clamping block and a connecting block; wherein:
the clamping block is mounted on the output end;
the connecting block is mounted on the pushing block;
the clamping block defines a latching slot facing the connecting block;
the connecting block is configured to be latched in the latching slot.

8. The variable spacing device of claim 7 further comprising a stopping block; wherein:
the stopping block is mounted on the support member;
the stopping block defines a stopping groove facing the connecting block;
the connecting block is stopped by two sidewalls of the stopping groove.

9. The variable spacing device of claim 1, wherein:
each movable grasper comprises a movable bracket and a grasping member;
the movable grasper is slidably mounted on the support member;
the grasping member is mounted on the movable bracket;
the grasping member is configured to grasp a workpiece.

10. The variable spacing device of claim 1 further comprising at least one guiding member comprising a guiding rail and a plurality of sliding blocks; wherein:
the guiding rail is mounted on the support frame;
the plurality of sliding blocks are slidably mounted on the guiding rail; and
each of the plurality of movable graspers is coupled to a corresponding one of the plurality of sliding blocks.

11. A variable spacing device configured to adjust a spacing of a plurality of workpieces, the variable spacing device comprising:
a support member;
a driving member;
a plurality of movable graspers;
a limiting block; and
a pushing block; wherein:
the plurality of movable graspers are slidably mounted in a line on the support member;
each of the plurality of movable graspers is adapted to grasp a workpiece;
the limiting block is mounted on the support member and arranged in parallel with the pushing member;
the limiting block defines a plurality of first sliding grooves each comprising a length, the length of each of the plurality of first sliding grooves being shorter than the length of a next adjacent sliding groove along a same direction;
the pushing block defines a plurality of second sliding grooves each comprising a length, the length of each of the plurality of second sliding grooves being longer than the length of a next adjacent sliding groove along the same direction;
each of the plurality of movable graspers is adapted to move within a corresponding one of the first sliding grooves and a corresponding one of the second sliding grooves;
two sidewalls of each first sliding groove and two sidewalls of each second sliding groove resist movement of the corresponding movable grasper;
a sum of a length difference of the two first sliding grooves and a length difference of the two second sliding grooves corresponding to two adjacent movable graspers is zero;
the driving member is mounted on the support member and is coupled to the pushing block;
the driving member is configured to drive the pushing block to move back and forth.

12. The variable spacing device of claim 11 further comprising a fixed grasper configured to grasp a workpiece; wherein:
the fixed grasper is mounted on the support member on a side of the plurality of movable graspers; and
one of the plurality of movable graspers is mounted on the pushing member.

13. The variable spacing device of claim 12, wherein:
the fixed grasper comprises a fixed frame and a grasper;
the fixed frame is mounted on the support member; and
the grasper is mounted on the fixed frame.

14. The variable spacing device of claim 13, wherein:
the fixed frame defines a clearance hole facing the pushing block; and
the pushing block is adapted to pass through the clearance hole.

15. The variable spacing device of claim 14, wherein:
the support member defines a through hole;
the driving member is arranged on a side of the support member facing away from the pushing block, the limiting block, and the plurality of movable graspers;
the pushing block is configured to slide within the through hole and pass through the through hole to couple to the driving member.

16. The variable spacing device of claim 15, wherein:
the driving member comprises a movable driving member and an output end;
the movable driving member is mounted on the support member;
the output end is mounted on the movable driving member;
the movable driving member is configured to drive the output end to extend or retract.

17. The variable spacing device of claim 16 further comprising a clamping block and a connecting block; wherein:
the clamping block is mounted on the output end;
the connecting block is mounted on the pushing block;
the clamping block defines a latching slot facing the connecting block;
the connecting block is configured to latch in the latching slot.

18. The variable spacing device of claim 17 further comprising a stopping block; wherein:
- the stopping block is mounted on the support member;
- the stopping block defines a stopping groove facing the connecting block;
- the connecting block is stopped by two sidewalls of the stopping groove.

19. The variable spacing device of claim 18, wherein:
- each movable grasper comprises a movable bracket and a grasping member;
- the movable grasper is slidably mounted on the support member;
- the grasping member is mounted on the movable bracket;
- the grasping member is configured to grasp a workpiece.

20. The variable spacing device of claim 19 further comprising at least one guiding member comprising a guiding rail and a plurality of sliding blocks; wherein:
- the guiding rail is mounted on the support frame;
- the plurality of sliding blocks are slidably mounted on the guiding rail; and
- each of the plurality of movable graspers is coupled to a corresponding one of the plurality of sliding blocks.

\* \* \* \* \*